United States Patent
Faulstich

[19]

[11] Patent Number: 5,906,222
[45] Date of Patent: May 25, 1999

[54] APPARATUS FOR DETECTING POSITION OF PISTON IN HYDRAULIC ACTUATOR COUPLED TO GATE VALVE

[75] Inventor: David Louis Faulstich, San Jose, Calif.

[73] Assignee: General Electric Company, San Jose, Calif.

[21] Appl. No.: 08/693,723

[22] Filed: Aug. 7, 1996

[51] Int. Cl.⁶ .................................................. F16K 37/00
[52] U.S. Cl. .............................. 137/554; 92/5 R; 340/686
[58] Field of Search ............................. 137/554; 92/5 R; 340/686; 200/61.86; 324/202, 207.26

[56] References Cited

U.S. PATENT DOCUMENTS

| | | | |
|---|---|---|---|
| 4,316,145 | 2/1982 | Tann ........................................ | 92/5 R X |
| 4,413,549 | 11/1983 | Knable ..................................... | 92/5 R |
| 4,569,365 | 2/1986 | Namand et al. ......................... | 137/554 |
| 4,726,282 | 2/1988 | LaBair ..................................... | 92/5 R |
| 4,827,248 | 5/1989 | Crudden et al. ......................... | 340/686 |
| 4,876,531 | 10/1989 | Dondorf .................................. | 340/686 |
| 5,121,110 | 6/1992 | Mahar, Jr. et al. .................... | 340/686 X |
| 5,455,509 | 10/1995 | Semura et al. ......................... | 92/5 R X |

FOREIGN PATENT DOCUMENTS

| 2907800 | 9/1980 | Germany ................................ | 137/554 |
|---|---|---|---|

*Primary Examiner*—John Rivell
*Attorney, Agent, or Firm*—James E. McGinness; Dennis M. Flaherty

[57] ABSTRACT

A hydraulic actuator for a gate valve incorporates an eddy current proximity sensor to detect a displaceable stem cap made of ferromagnetic material. The stem cap is mounted on one end of an actuating stem. The other end of the stem is coupled to a plunger having a cammed tip which meets a cam attached to the piston. The camming action moves the stem cap from a position out of proximity to a position in proximity to the eddy current proximity sensor when the piston is at the end of its stroke. The proximity sensor is mechanically coupled to the stem housing by means of a housing cap, a barrel and a sensor cap, all made of non-magnetic material. The barrel is threaded at both ends with opposing threads so the barrel can be screwed onto the housing and sensor caps at the same time, thereby drawing the housing and end caps toward each other without sensor rotation. This feature allows the proximity sensor to be positioned at the correct distance from the stem cap without damage to the sensor connector wires. Lock nuts are employed to lock the barrel in position on the housing cap and sensor cap.

17 Claims, 2 Drawing Sheets

APPARATUS FOR DETECTING POSITION OF PISTON IN HYDRAULIC ACTUATOR COUPLED TO GATE VALVE

FIELD OF THE INVENTION

This invention is generally related to improvements in actuators for operating control elements such as valves and flaps. In particular, the invention relates to actuators which make linear movements for driving valves to open and close.

BACKGROUND OF THE INVENTION

Linear hydraulic actuators for opening or closing a gate valve are known. One known embodiment of a hydraulic actuator is used to operate a bottom gate valve in an inclined fuel transfer system of a particular type of boiling water reactor. The known hydraulic actuator has a pair of pin-actuated limit switches which indicate the ends of the stroke of the piston inside the hydraulic actuator.

In accordance with the foregoing system, each pin-actuated limit switch is encased in a respective sealed canister mounted to the cylinder of the actuator at respective axial positions. For each limit switch, a plunger is deflected by a cam which is rigidly fixed relative to the piston. One cam extends in front of the piston and leads the piston during its forward stroke. The other cam extends to the rear of the piston and leads the piston during its return stroke. The first limit switch is triggered, at the end of the forward stroke of the piston, when its plunger is deflected by the front cam; the second limit switch is triggered, at the end of the return stroke of the piston, when its plunger is deflected by the rear cam.

The aforementioned limit switches operate electrically. Although housed in a sealed canister, the limit switches are prone to failure in the submerged location of the inclined fuel transfer system of a boiling water reactor. Switch failure is due to the intrusion of water vapor and water into the canister. Thus, there is a need for a position detector which will operate reliably even when exposed to water vapor and water.

SUMMARY OF THE INVENTION

The present invention is a position indicating sensor assembly which can be substituted for the limit switch assemblies currently used in the hydraulic actuator controlling the bottom gate valve in the aforementioned inclined fuel transfer system. The position indicating sensor assembly of the invention incorporates a proximity sensor which uses the eddy current effect to detect the presence of sliding component made of ferromagnetic material.

In accordance with a preferred embodiment of the invention, each position indicating sensor assembly comprises a stem cap made of ferromagnetic material, e.g., stainless steel, and mounted on one end of an actuating stem. The other end of the actuating stem is coupled to a slidable plunger having a cammed tip which protrudes into the path of travel of a cam which moves in tandem with the piston. As a result of the camming action, the plunger, stem and stem cap are deflected radially outward relative to the cylinder axis. This deflection moves the stem cap from a position out of proximity to the stationary proximity sensor to a position in proximity to the proximity sensor. The camming surfaces are arranged so that the proximity sensor detects proximity of the stem cap when the piston is at the end of its stroke.

In accordance with a further feature of the invention, the proximity sensor is mechanically coupled to the stem housing by means of a pair of adaptors and a barrel having ends which screw onto the respective adaptors. The adaptors and the barrel are made of non-magnetic material, preferably aluminum. Consequently, the eddy current proximity sensor will not detect the presence of the barrel which surrounds the proximity sensor. The adaptors are made of non-magnetic material to eliminate any source of ferromagnetic metal which could interfere with detection of the ferromagnetic stem cap.

In accordance with another feature of the invention, the barrel is threaded at both ends with opposing threads. The left-hand threads on one end of the barrel threadably engage the left-hand threads on the adaptor which screws onto the stem housing. The adaptor which screws onto the stem housing is hereinafter referred to as the "housing cap". The right-hand threads on the other end of the barrel threadably engage the right-hand threads on the adaptor which screws onto the proximity sensor. The adaptor which screws onto the proximity sensor is hereinafter referred to as the "sensor cap". The provision of opposing threads on the two ends of the barrel allows the barrel to be screwed onto the housing cap and sensor cap at the same time. This rotation of the barrel draws the housing and end caps toward each other in the manner of a turnbuckle. This feature allows the proximity sensor to be positioned at the correct distance from the stem cap so that the stem cap is detected when the stem assembly is deflected radially outward and the stem cap is in proximity to the sensor, and is no longer detected when the stem assembly is withdrawn and the stem cap is out of proximity to the sensor. Lock nuts are employed to lock the barrel in position on the housing and sensor caps.

The advantage of a barrel having ends with opposing threads is that the barrel can be coupled to the stem housing and the proximity sensor simultaneously without rotation of the proximity sensor. This reduces the risk of damage to the sensor connector wires, which would otherwise be twisted if the proximity sensor were rotated. The proximity is easily replaceable in this manner.

DETAILED DESCRIPTION OF THE PREFERRED EMBODIMENTS

The present invention is incorporated as part of a hydraulic actuator for opening and closing a bottom gate valve in an inclined fuel transfer system of a boiling water reactor. Although the invention is described in connection with a gate valve, it will be apparent to those skilled in the art that the invention also has application in linear actuators for controlling other kinds of valves and in other devices which require position indication.

Figure 1:
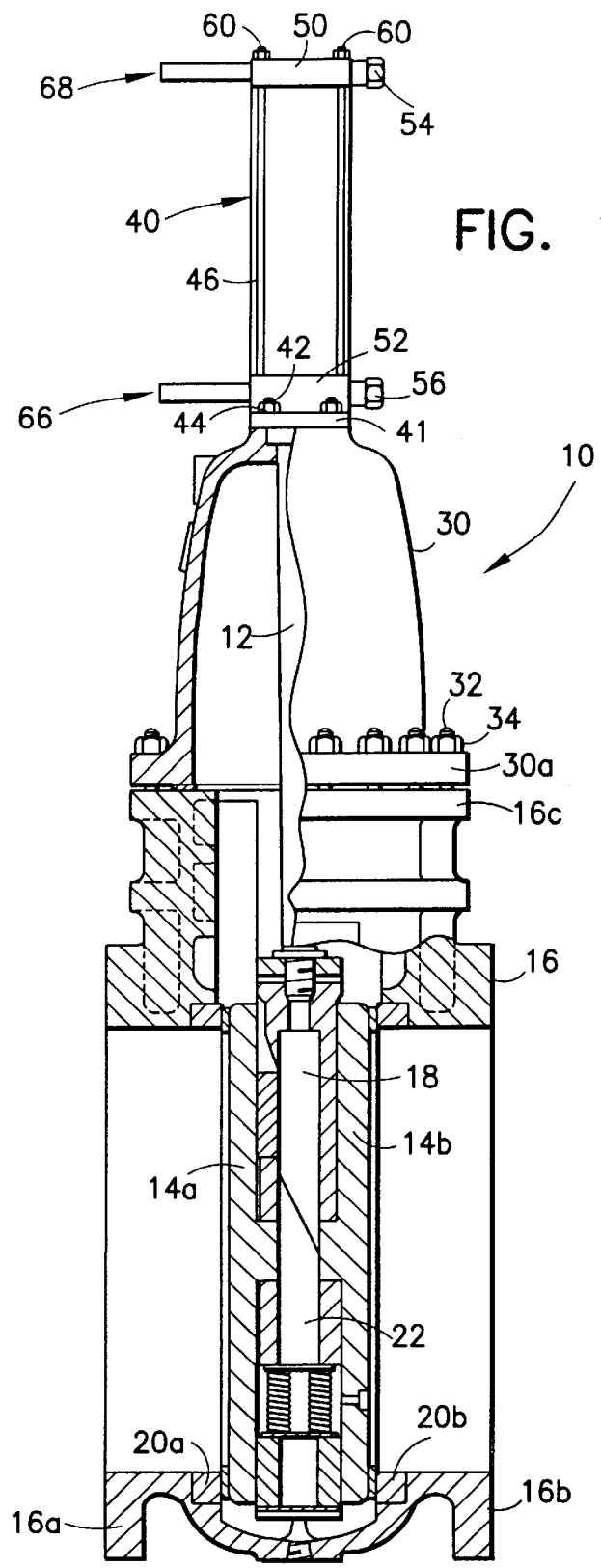
FIG. 1 is a schematic showing a partially sectioned elevation view of a gate valve controlled by a hydraulic actuator in accordance with the present invention.

Referring to FIG. 1, a bottom gate valve 10 comprises an upper wedge 18 mounted on the end of a valve stem 12. During the downward stroke of the valve stem 12, the upper wedge 18, in cooperation with the lower wedge 22, wedge the disks 14a and 14b apart so that they press tightly against the respective seat rings 20a and 20b. The valve housing 16 comprises a flange 16a which is joined to a first pipe (not shown) and a flange 16b which is joined to a second pipe (not shown). Thus, when the valve is open (not shown in FIG. 1), the first and second pipes are in fluid communication. When the valve is closed, as shown in FIG. 1, the pipes are not in fluid communication.

A bonnet 30 has a mounting flange 30a which is attached to an upper rim 16c of the valve housing 16 by a multiplicity (24) of bonnet studs 32 and bonnet nuts 34. In turn, a hydraulic actuator 40 has a mounting flange 41 which is attached to an upper rim of the bonnet 30 by a plurality (four) of actuator studs 42 and actuator nuts 44. The hydraulic actuator 40 comprises a cylinder formed by a rear cap 50, a front cap 52 connected to the mounting flange 41 and a cylindrical tube 46 held between caps 50 and 52 by a plurality (four) of tie rods 60.

Figure 2:
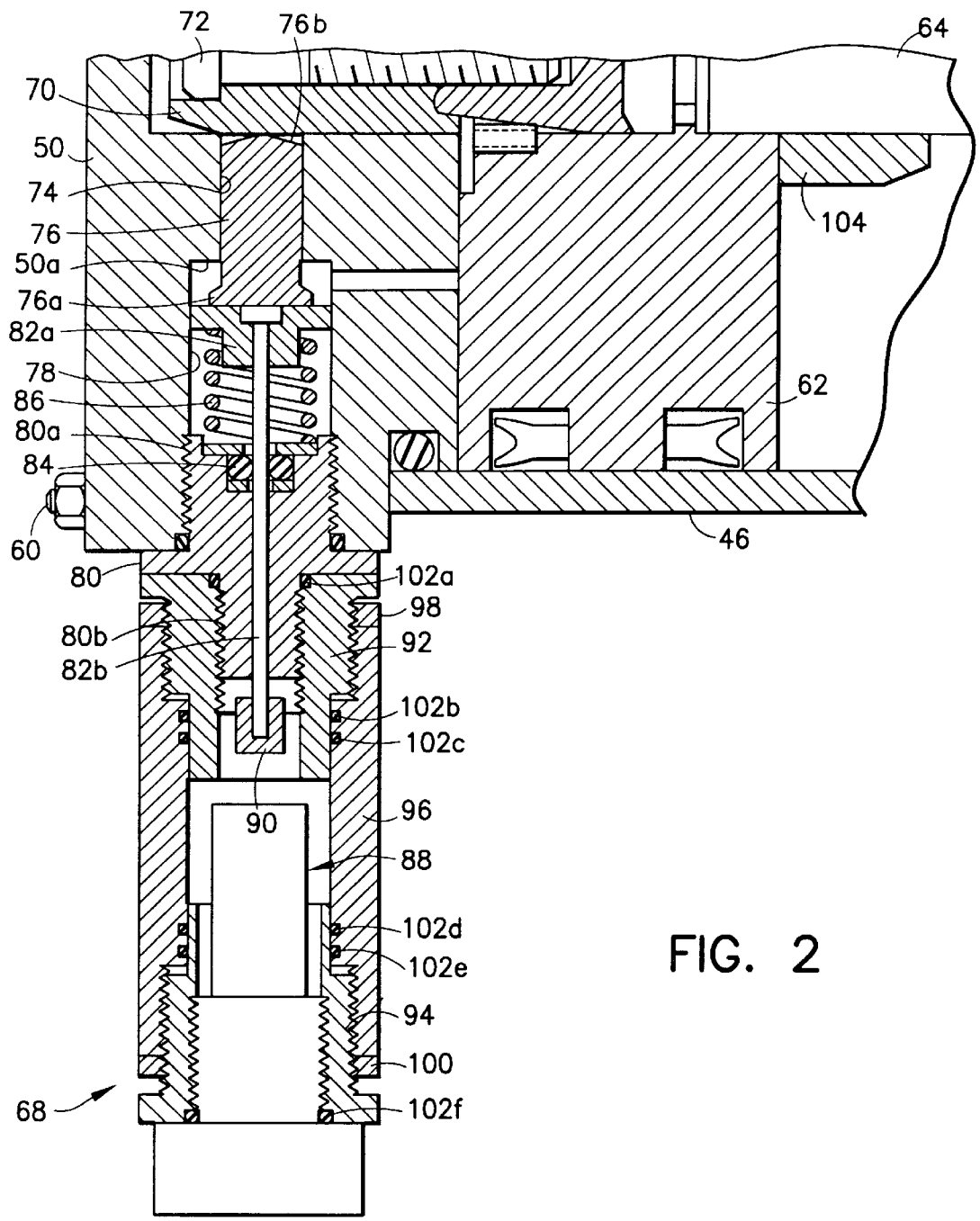
FIG. 2 is a schematic showing a sectional view of a position indicating sensor assembly in accordance with the preferred embodiment of the invention.

Referring to FIG. 2, the hydraulic actuator further comprises a piston 62 which slides inside the tube 46. One end of a piston rod 64 is coupled in a central opening in the piston. The other end of the piston rod (not shown in FIG. 2) is coupled to the valve stem 12 (see FIG. 1). The piston 62, piston rod 64, valve stem 12 and valve disk assembly 14 form a rigid assembly which displaces as a unit in the forward or rearward directions in response to the supply of pressurized water into the hydraulic cylinder. For example, a port adaptor 54 coupled to rear cap 50 provides pressurized water to the rear of the piston for forcing the piston forward and thus closing the gate valve. Similarly, a port adaptor 56 coupled to front cap 52 of the actuator provides pressurized water to the front of the piston for forcing the piston rearward and thus opening the gate valve.

In accordance with the invention, a pair of position indicating sensor assemblies 66 and 68 (se FIG. 1) are coupled to the hydraulic actuator so that they respectively detect the end of the forward stroke of the piston and the end of the return stroke of the piston. The sensor assembly 68 will be described in detail with reference to FIG. 2 with the understanding that sensor assembly 66 has a similar structure.

Referring to FIG. 2, a cam 70 is attached to the rear end of the piston rod 64 by a screw 72. During the return stroke of the piston, the cam 70 slides across the mouth of a radial circular cylindrical hole 74 formed in the rear cap 50. A plunger 76 is slidably arranged in hole 74. One end 76a of plunger 76 has a diameter greater than the diameter of hole 74 and acts as a limit stop with respect to radially inward displacement of plunger 76. The other end 76b of plunger 76 has a camming surface which protrudes out of hole 74 when limit stop 76a abuts surface 50a of rear cap 50.

The limit stop 76a resides in a circular cylindrical hole 78 which communicates with hole 74 and is coaxial therewith. Hole 78 has a diameter greater than the diameter of hole 74 for slidably receiving a stem piston 82a of a stem assembly. The stem piston 82a has a flat endface which bears against an opposing flat endface on the plunger 74. The distal portion of hole 78 has internal threads which threadably engage the external threads on a first threaded body 80a of a stem housing 80, whereby the stem housing is screwed into the rear cap 50. Stem housing 80 has a second threaded body 80b with external threads for threadably engaging the internal threads of an adaptor, to be described hereinafter. The stem housing 80 has a central bore in which the stem 82b of the stem assembly is slidably arranged. The first threaded body 80a has an annular recess surrounding the stem 82b in which a seal 84 is installed. A compression spring 86 is arranged between the stem housing 80 and the stem piston 82a for urging the plunger 76 radially inward toward the hydraulic cylinder axis.

At its most radially inward position, the camming end 76b of plunger 76 protrudes out of hole 74 and into the path of cam 70 attached to the piston. During the return stroke of piston 62, the cam 70 bears against camming end 76b and cams plunger 76 radially outward. Because the opposing endfaces of plunger 76 and stem piston 82a are in contact, the stem assembly is displaced radially outward in tandem with plunger 76.

In accordance with the present invention, a sensor assembly 68 is attached to the threaded body 80b of the stem housing 80. The sensor assembly 68 comprises an eddy current proximity sensor 88 which detects proximity of a stem cap 90 mounted on the distal end of stem 82b. The stem cap 90 is made of a ferromagnetic material, such as steel, ranging from stainless steel having minimum magnetic properties to carbon steel having greater magnetic properties.

The proximity sensor 88 is mechanically coupled to the stem housing by means of a sensor support assembly comprising a stem housing cap 92, a sensor cap 94 and a barrel 96. The stem housing cap 92 is an adaptor threadably coupled to threaded end 80b of stem housing 80 and having external left-handed threads. The sensor cap 94 is an adaptor threadably coupled to the proximity sensor 88 and having external right-handed threads. The barrel 96 is a circular cylinder having internal left-handed threads at one end which threadably engage a portion of the external left-handed threads on stem housing cap 92 and internal right-handed threads at the other end which threadably engage a portion of the external right-handed threads on sensor cap 94. The caps 92 and 94 and the barrel 96 are made of non-magnetic material, preferably aluminum. Consequently, the eddy current proximity sensor 88 will not detect the presence of barrel 96, which surrounds the sensor.

The provision of opposing threads on the two ends of the barrel 96 allows the barrel to be screwed onto the stem housing cap 92 and sensor cap 94 at the same time. This rotation of the barrel 96 draws the stem housing cap and end cap toward each other in the manner of a turnbuckle. This allows the proximity sensor 88 to be positioned at the correct distance from the stem cap 90 so that the stem cap is detected when the stem cap is deflected into proximity with the sensor by the cam 70 at the end of the return stroke of the piston, and the stem cap is in proximity to the sensor, whereas the stem cap is no longer detected when the stem cap is urged out of proximity with the sensor by the spring 86 when cam 70 does not interfere with plunger 74.

When the desired position of the sensor is achieved by adjustment of the barrel 96, lock nuts 98 and 100 are employed to lock the barrel in position on the stem housing and sensor caps. In particular, lock nut 98 has internal left-handed threads which threadably engage a portion of the external threads on stem housing cap 92. Lock nut 98 is torqued tightly against the opposing endface of barrel 96. Lock nut 100 has internal right-handed threads which threadably engage a portion of the external threads on sensor cap 94. Lock nut 100 is torqued tightly against the other endface of barrel 96.

Due to the submerged location of the hydraulic actuator, a multiplicity of O-ring seals are incorporated in the sensor support assembly in an attempt to isolate the stem cap and proximity sensor from intruding water. O-ring 102a seals an interface between the stem housing 80 and the stem housing cap 92; O-rings 102b and 102c seal an interface between the stem housing cap 92 and the barrel 96; O-rings 102d and 102e seal an interface between the barrel 96 and the sensor cap 94; and O-ring 102f seals an interface between the sensor cap 94 and the proximity sensor 88. The O-rings 102b–102e reside in respective annular grooves formed on the inner circumference of the barrel.

As a result of the camming action between cam 70 and camming surface 76b of plunger 76, the plunger 76, the stem assembly 82a/82b and the stem cap 90 are deflected radially outward relative to the hydraulic cylinder axis. This deflection moves the stem cap from a position out of proximity to the proximity sensor 88 to a position in proximity to the proximity sensor. The camming surfaces are arranged so that the proximity sensor detects proximity of the stem cap when the piston is at the end of its return stroke.

In an analogous manner, a sensor assembly in accordance with the invention can be employed to detect the end of the forward stroke of the piston. This requires the placement of a front cam 104 (shown in FIG. 2) around the piston rod 64 and in front of the piston 62. The front cam deflects a second plunger—similar in structure to plunger 76, but not shown in FIG. 2—to cause a second ferromagnetic stem cap (not shown) to move into proximity to a second eddy current proximity sensor (66 in FIG. 1). The front cam and the second plunger are arranged so that plunger deflection occurs at the end of the piston forward stroke.

The preferred embodiment of the invention has been disclosed for the purpose of illustration. Variations and modifications of the disclosed structure which do not depart from the concept of this invention will be readily apparent to engineers skilled in the pertinent art. All such variations and modifications are intended to be encompassed by the claims set forth hereinafter.

I claim:

1. An apparatus for detecting a predetermined position of an element which is displaceable along an axis of displacement, comprising:
   a plunger which is displaced from a first plunger position to a second plunger position along a plunger axis in response to the element being displaced along said axis of displacement from a first element position to a second element position, said plunger axis and said axis of displacement being non-parallel;
   a stem housing fixedly arranged relative to said axis of displacement and having a hole disposed parallel to said plunger axis;
   a stem assembly comprising a stem and a piston connected to one end of said stem, said stem being slidably arranged in said stem housing hole;
   a compression spring arranged between said stem assembly piston and said stem housing for urging said stem assembly piston into contact with said plunger;
   a stem cap made of ferromagnetic material and attached to another end of said stem, said stem cap occupying a first stem cup position when said plunger occupies said first plunger position and a second stem cup position when said plunger occupies said second plunger position;
   an eddy effect proximity sensor; and
   an assembly for supporting said proximity sensor at a fixed position relative to said stem housing, whereat said proximity sensor can detect said stem cap when said stem cap is in said second position, but not when said stem cap is in said first position, and wherein said proximity sensor supporting assembly comprises:
      a first adaptor threadably coupled to stem housing and having external threads with a first hand;
      a second adaptor threadably coupled to proximity sensor and having external threads with a second hand opposite to said first hand; and
      a barrel having internal threads with said first hand at one end and internal threads with said second hand at another end, said internal threads with said first hand being threadably engaged with a first portion of said external threads of said first adaptor, and said internal threads with said second hand being threadably engaged with a first portion of said external threads of said second adaptor.

2. The apparatus as defined in claim 1, wherein said barrel is made of non-magnetic material.

3. The apparatus as defined in claim 2, wherein said first and second adaptors are made of non-magnetic material.

4. The apparatus as defined in claim 2, wherein said non-magnetic material is aluminum.

5. The apparatus as defined in claim 1, further comprising first and second lock nuts, said first lock nut having internal threads with said first hand threadably engaged with a second portion of said external threads of said first adaptor, and said second lock nut having internal threads with said second hand threadably engaged with a second portion of said external threads of said second adaptor.

6. The apparatus as defined in claim 1, further comprising:
   a first seal which seals an interface between said stem housing and said first adaptor;
   a second seal which seals an interface between said first adaptor and said barrel;
   a third seal which seals an interface between said barrel and said second adaptor; and
   a fourth seal which seals an interface between said second adaptor and said proximity sensor.

7. A valve actuator comprising:
   a cylinder having an axis;
   a first piston slidably arranged inside said cylinder for sliding displacement parallel to said cylinder axis;
   a piston rod connected to said first piston;
   a plunger which is displaced from a first plunger position to a second plunger position alone a plunger axis in response to said first piston being displaced along said cylinder axis from a first piston position to a second piston position, said plunger axis and said cylinder axis being non-parallel;
   a stem housing fixedly arranged relative to the cylinder and having a hole disposed parallel to said plunger axis;
   a stem assembly comprising a stem and a second piston connected to one end of said stem, said stem being slidably arranged in said stem housing hole;
   a compression spring arranged between said second piston and said stem housing for urging said second piston into contact with said plunger;
   a stem cap made of ferromagnetic material and attached to another end of said stem, said stem cap occupying a first stem cup position when said plunger occupies said first plunder position and a second stem cup position when said plunger occupies said second plunger position;
   an eddy effect proximity sensor; and
   an assembly for supporting said proximity sensor at a fixed position relative to said stem housing, whereat said proximity sensor can detect said stem cap when said stem cap is in said second position, but not when said stem cap is in said first position, and wherein said proximity sensor supporting assembly comprises:
      a first adaptor threadably coupled to stem housing and having external threads with a first hand;
      a second adaptor threadably coupled to proximity sensor and having external threads with a second hand opposite to said first hand; and a barrel having internal threads with said first hand at one end and internal threads with said second hand at another end, said internal threads with said first hand being threadably engaged with a first portion of said external threads of said first adaptor, and said internal threads with said second hand being threadably engaged with a first portion of said external threads of said second adaptor.

8. The valve actuator as defined in claim 7, wherein said barrel is made of non-magnetic material.

9. The valve actuator as defined in claim 8, herein said first and second adaptors are made of non-magnetic material.

10. The valve actuator as defined in claim 8, wherein said non-magnetic material is aluminum.

11. The valve actuator as defined in claim 7, further comprising first and second lock nuts, said first lock nut having internal threads with said first hand threadably engaged with a second portion of said external threads of said first adaptor, and said second lock nut having internal threads with said second hand threadably engaged with a second portion of said external threads of said second adaptor.

12. The valve actuator as defined in claim 7, further comprising:
   a first seal which seals an interface between said stem housing and said first adaptor;
   a second seal which seals an interface between said first adaptor and said barrel;
   a third seal which seals an interface between said barrel and said second adaptor; and
   a fourth seal which seals an interface between said second adaptor and said proximity sensor.

13. An apparatus for detecting sliding displacement of an element from a first element position to a second element position along an axis of a cylindrical recess formed in a solid body having external threads, comprising:
   a cap made of ferromagnetic material and attached to an end of said element protruding from said solid body, said cap occupying a first cap position when said element occupies said first element position and a second cap position when said element occupies said second element position;
   an eddy effect proximity sensor having external threads; and
   an assembly for supporting said proximity sensor at a fixed position relative to said solid body whereat said proximity sensor can detect said cap when said cap is in said second cap position, but not when said cap is in said first cap position, said assembly comprising:
   a first adaptor having internal threads threadably engaged to said external threads of said solid body and having external threads with a first hand;
   a second adaptor having internal threads threadably engaged to said external threads of said proximity sensor and having external threads with a second hand opposite to said first hand; and
   a barrel having internal threads with said first hand at one end and internal threads with said second hand at another end, said internal threads with said first hand being threadably engaged with a first portion of said external threads of said first adaptor, and said internal threads with said second hand being threadably engaged with a first portion of said external threads of said second adaptor.

14. The apparatus as defined in claim 13, wherein said barrel and said first and second adaptors are made of non-magnetic material.

15. The apparatus as defined in claim 14, wherein said non-magnetic material is aluminum.

16. The apparatus as defined in claim 13, further comprising first and second lock nuts, said first lock nut having internal threads with said first hand threadably engaged with a second portion of said external threads of said first adaptor, and said second lock nut having internal threads with said second hand threadably engaged with a second portion of said external threads of said second adaptor.

17. The apparatus as defined in claim 13, further comprising:
   a first seal which seals an interface between said solid body and said first adaptor;
   a second seal which seals an interface between said first adaptor and said barrel;
   a third seal which seals an interface between said barrel and said second adaptor; and
   a fourth seal which seals an interface between said second adaptor and said proximity sensor.

* * * * *